June 2, 1925.  1,540,529
H. W. BLAISDELL
VALVE
Filed July 26, 1922
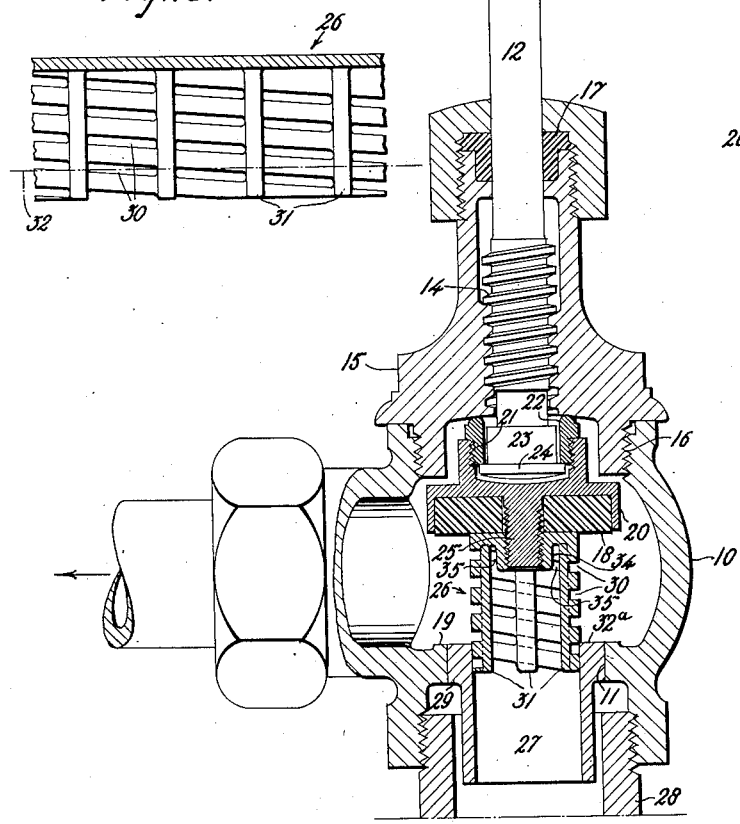
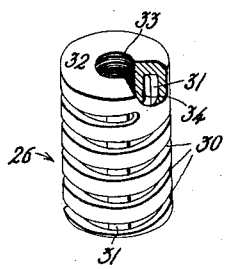
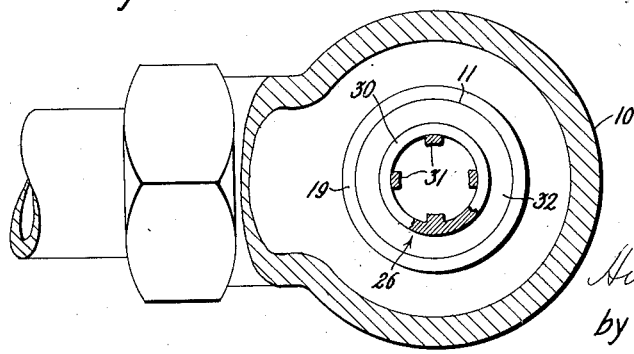
Inventor:
Hiram W. Blaisdell
by D. C. Stickney
Attorney

UNITED STATES PATENT OFFICE.

HIRAM W. BLAISDELL, OF NEW YORK, N. Y.

VALVE.

Application filed July 26, 1922. Serial No. 577,502.

*To all whom it may concern:*

Be it known that I, HIRAM W. BLAISDELL, a citizen of the United States, residing in the borough of Manhattan, city, county, and State of New York, have invented certain new and useful Improvements in Valves, of which the following is a specification.

This invention relates to valves for regulating the feed of steam to radiators and other steam-using apparatus.

One of the objects of the invention is to produce a simple, inexpensive, reliable valve structure having a great range of regulation. Another object is to produce a valve device that can be cheaply made and readily substituted for the valves of existing structures.

In the preferred manner of practicing the invention, the usual cylindrical plug or valve is detached from the bottom of the valve stem, and a new valve substituted, the new valve being a hollow cylinder, whose wall is helically slitted to form the porting; ribs being provided to retain the whorls. This valve may work in a throat of reduced diameter and increased length, having the form of a tube or lining forced into the throat originally formed in the housing.

Other features and advantages will hereinafter appear.

In the accompanying drawings,

Figure 1 is a sectional elevation of the improvements substituted in a valve of standard construction.

Figure 2 is a development of the helically slotted cylindrical valve.

Figure 3 is a perspective view of the valve.

Figure 4 is a sectional plan taken at about the middle of the valve chamber.

In the usual construction, a chamber or housing 10 contains a valve, which works vertically in a throat 11, which is provided in the bottom of the housing; the adjustment of the valve being usually secured by a stem 12, carrying a hand-wheel 13, and having a portion 14 threaded into a cap 15, the latter threaded at 16 into the top of the housing, and carrying a gland 17 for the stem. To the bottom portion of the stem is usually attached an annular packing 18, which screws down upon a seat 19 provided at the top of the throat 11. This packing is carried in a knuckle 20, which is loosely connected to the stem in various ways, as, for example, by threading it at 21 upon a collar 22 which loosely surrounds a boss 23 formed on the bottom of the stem 12, said collar catching over a head 24 provided on the stem under said boss. From said knuckle usually extends downwardly a threaded stem 25, upon which is usually screwed a cylindrical plug or valve to fit in the throat 11.

In practicing the present improvements in one way, the usual cylindrical plug or valve may be removed, and there may be substituted therefor a ported cylindrical shell or valve 26 of relatively small diameter, and working up and down in a cylindrical bushing or lining (or throat) 27 inserted in said throat 11. Said bushing may have great depth, for proper co-action with the valve, and it may have relatively small diameter, so as to find room within the top of the steam supply-pipe 28 upon which the valve housing is threaded. The diameter of the original throat 11 in the housing is usually greater than the internal diameter of said supply-pipe 28, but, by forming a head 29 upon said bushing, it may be made of sufficient diameter to fill the original throat, said head being forced into the throat or otherwise rigidly secured.

The porting of the valve is effected by slitting the same helically throughout, as at 30, thus forming the cylinder into a helix, the whorls of which may be connected together so as to be supported and retained in place by means of interior ribs 31, preferably vertical, and all integral with the helix. The cylinder may be cast with its ribs, and then the helical slit may be cut through the cylinder wall. The helix preferably forms a single thread, the same being formed by a single helical slot running around the cylinder from end to end.

When the handle 13 is screwed down, the packing 18 rests upon the original seat 19 or upon the top 32$^a$ of the inserted bushing or interior throat. Upon unscrewing the handle a trifle, the packing 18 will be lifted from the seat, and permit a slight feed of steam to the radiator, since some steam will find its way up around the sides of the cylindrical valve, which may be slightly loose in said bushing or throat 27. The handle 13 may, if desired, be given a further turn, so that the top end of the helical slot 30 will rise above the seat, thus affording a small passage for steam directly through the valve into the radiator. The helical slot or porting may be so narrow that only a very little steam is admitted. Thus the radiator will be only moderately heated, even if the weather is moderately warm and the steam is of comparatively high pressure. More steam can then be admitted, if desired, by unscrewing the valve further, so that the radiator may be made as warm as desired; and by raising the valve as far as it will go, as in Figure 2, a maximum feed of steam is secured. The steam blows sidewise beneath the packing, and hence does not destroy the same.

At the top of the cylinder or valve 26 is formed a head 32, said head being interiorly threaded at 33 to screw upon the pendent stem 25, Figure 1. It is desired to carry the slitting or porting of the cylinder up to a point close to the top thereof, as in Figure 3, this point being above the bottom of the threaded perforation 33 in said head. For this purpose, an interior nut 34 is cast centrally upon said head and depends within the cylinder, the diameter of the nut being small so as to leave a considerable clearance 35 around the nut for the passage of steam as it flows into the radiator.

Variations may be resorted to within the scope of the invention, and portions of the improvements may be used without others.

Having thus described my invention, I claim:

1. A steam regulating device, comprising a valve housing, a lifting stem therein, a hollow cylindrical valve connected to the stem, and a throat in which said valve is adjustable up and down by means of said stem, said valve being helically slitted to form a porting, and also having integral interior ribs or connections to support the whorls.

2. A steam regulating device, comprising a valve housing, a lifting stem therein, a hollow cylindrical valve connected to the stem, and a throat in which said valve is adjustable up and down by means of said stem, said valve being helically slitted to form a porting, and also having interior ribs or connections to support the whorls, said throat comprising a tube fitted tightly in said housing.

3. A steam regulating device, comprising a valve housing, having a seat surrounding the passage therethrough, a lifting stem in the housing, a hollow cylindrical valve connected to the stem, a throat in which said valve is adjustable up and down by means of said stem, said valve being helically slitted to form a porting, and having integral interior ribs or connections to support the whorls, and a packing carried by said stem above said ported valve, and adapted to be forced down by the stem against said seat to prevent leakage of steam.

4. In a steam regulating device, the combination of a valve housing having a throat, a bushing secured in said throat, a hollow valve working longitudinally in said bushing, said valve being cylindrically ported, and a lifting stem to which said valve is attached, said bushing being of a small diameter and spaced from the wall of said housing to drop within the top of the steam supply pipe to which the regulating device is screwed.

5. In a steam regulating device, the combination of a valve housing having a throat, a bushing secured in said throat, a hollow cylindrical valve working longitudinally in said bushing, said valve being cylindrically ported, and a lifting stem to which said valve is attached, said bushing being of a small diameter and spaced from the wall of said housing to drop within the top of the steam supply pipe to which the regulating device is screwed, and the head formed upon said bushing of sufficient diameter to fill the original throat in the housing.

6. A steam valve, comprising a housing and a valve therein, the valve comprising a hollow cylindrical body slit helically to form whorls, and means for connecting and retaining the whorls in place.

7. A steam valve comprising a housing and a valve therein, the valve comprising a hollow cylindrical body slit helically to form whorls, and means for connecting and retaining the whorls in place, said retaining means being in the from of ribs cast integrally with the cylinder.

8. A steam valve, comprising a housing and a valve therein, the valve comprising a hollow cylindrical body having a single helical slit running around the cylinder from end to end to form whorls, and means for connecting and retaining the whorls in place.

9. A steam valve, comprising a housing and a valve therein, the valve comprising a hollow cylindrical body slit helically to form whorls, means for connecting and retaining the whorls in place, said housing having a seat, and a packing surrounding said cylinder and adapted to be pressed down upon the seat.

10. As a new article of manufacture, an adjustable steam valve, formed of a hollow cylinder helically slitted from end to end to form whorls, and means for connecting and retaining the whorls in place, said retaining means being in the form of ribs cast integrally with the cylinder.

11. As a new article of manufacture, a valve formed of a hollow cylinder helically slitted from end to end, and integral means to connect the whorls together and hold them in place.

12. A steam regulating device, comprising a valve housing having a throat surrounded by a seat, a hollow cylindrical valve longitudinally adjustable in said throat, manually operable adjusting means for said valve, packing upon said valve, adapted to be forced down upon said seat, a nipple depending from said adjusting means, said valve having an interior nut, whereby it is threaded upon said depending nipple, and being slit helically from top to bottom, and interior integral ribs upon said valve to connect the whorls together and hold them in place.

HIRAM W. BLAISDELL.

Witnesses:
CATHERINE A. NEWELL,
EDITH B. LIBBEY.